(12) United States Patent
Jain

(10) Patent No.: US 6,390,343 B1
(45) Date of Patent: May 21, 2002

(54) CARGO CARRIER MECHANISM

(76) Inventor: Vinoo Kumar Jain, 3416 Spartan Way, Sacramento, CA (US) 95826

( * ) Notice: Subject to any disclaimer, the term of this patent is extended or adjusted under 35 U.S.C. 154(b) by 0 days.

(21) Appl. No.: 09/637,966

(22) Filed: Aug. 11, 2000

(51) Int. Cl.[7] .................................................. B60R 9/00
(52) U.S. Cl. ....................... 224/524; 224/504; 224/505; 224/506; 224/507; 224/924
(58) Field of Search ................................ 224/524, 503, 224/504, 505, 506, 507, 924, 525

(56) References Cited

U.S. PATENT DOCUMENTS

| | | | |
|---|---|---|---|
| 5,427,289 A | | 6/1995 | Ostor |
| 5,676,292 A | * | 10/1997 | Miller ........................ 224/524 |
| 5,775,560 A | * | 7/1998 | Zahn et al. .................. 224/524 |
| 5,806,736 A | | 9/1998 | Kincart |
| 5,806,737 A | | 9/1998 | Clark |
| 5,853,278 A | | 12/1998 | Frantz |
| 5,862,966 A | * | 1/1999 | Mehls ........................ 224/504 |
| 6,006,973 A | | 12/1999 | Belinky et al. |
| 6,062,451 A | | 5/2000 | Lassanske et al. |

* cited by examiner

Primary Examiner—Stephen K. Cronin
Assistant Examiner—Maerena W. Brevard
(74) Attorney, Agent, or Firm—Theodore J. Bielen, Jr.

(57) ABSTRACT

A vehicle hitch supported cargo carrier mechanism connectable to the hitch of the vehicle located above a ground surface utilizing an adapter. The adapter connects to the hitch of the vehicle. A base member is connected to the adapter and utilizes an upright element, which extends outwardly from the adapter. A platform capable of carrying cargo links to connector. The connector is rotatably fastened to the upright element permitting the platform to also rotate from a horizontal position to a vertical position. A lock fixes the rotational movement of the platform as desired between the horizontal and vertical position.

8 Claims, 3 Drawing Sheets

CARGO CARRIER MECHANISM

BACKGROUND OF THE INVENTION

The present invention relates to a novel and useful vehicle hitch supported cargo carrier mechanism.

Trailer hitches are commonly used on vehicles to tow trailers and to support other devices. For example, bicycle racks are commonly supported by trailer hitches. In most cases, trailers and other items supported by a trailer hitch of a vehicle must be removed and stored when not in use due to constraints of space and bulk.

In the past, items such as a bicycle rack depicted in U.S. Pat. No. 6,062,451 are designed to fit in the trailer hitch of a vehicle. Such a rack is capable of rotating downwardly and upwardly for the purpose of clearance in the back of a vehicle, permitting the user to open the hatch door normally found in that position.

U.S. Pat. Nos. 5,806,736, 5,806,737, and 5,853,278 depict cargo carrying items which are connected to the trailer hitch of a vehicle and are swingable away from the vehicle along a vertical axis. In essence, such movement permits access to the rear of the vehicle and operation of a door of the vehicle in that area.

U.S. Pat. Nos. 5,427,289 and 6,006,973 show vehicle carriers which are attached to vehicles and rotatable about a horizontal axis through a hinge mechanism. The platforms are normally located at a level along the axis of the hitch carrier.

A vehicle hitch cargo carrier mechanism which is useable without removing the same from the hitch without contacting the ground surface during use would be a notable advance in the field of vehicle accessories.

BRIEF SUMMARY OF THE INVENTION

In accordance with the present invention a novel and useful vehicle hitch supported cargo carrier useable with a vehicle hitch is herein provided.

The hitch supported cargo carrier mechanism of the present invention utilizes an adapter which connects to the hitch of the vehicle. For example, where the vehicle hitch is a hollow female type fitting, the adapter would comprise a male fitting which is capable of slidingly engaging the female fitting and being locked in a certain position. The adapter may be formed of any material suitable for interconnection to the vehicle hitch. The adapter may be locked into place using a bolt and locking pin device, of conventional configuration.

A base member is connected to the adapter. The base member may include an upright element, which extends outwardly from the adapter. In normal usage situations, such extension of the upper right element is in a vertical position away from the surface employed by the vehicle. The upright element may take the form of a pair of plates that are spaced from one another forming a recess therebetween. Plates may include a plurality of openings that are alignable with one another, the purpose of which will be discussed hereinafter.

A platform is also employed in the present invention. The platform may be of any size and configuration suitable for carrying particular cargo. For example, the platform may be rectangular having a solid or mesh bottom. The platform may also include a wall portion and/or a series of posts to extend upwardly to permit the carrying of cargo having elevational features.

A connector is linked to the platform. The connector is capable of rotatably fastening to the upright element. Where the upright element includes a pair of plates, the connector may also be formed with a pair of plates that fit within the recess formed by the pair of plates of the upright member. Again, the connector may include a plurality of openings that align with one another and commensurate openings in the pair of plates formed by the upright member in that configuration. Thus, the connector and linked platform are rotatable from a generally horizontal position to a generally vertical position. Stops may also be included to prevent rotation of the platform below such horizontal position or beyond a vertical position.

Locking means is also found in the present invention for fixing the rotational movement of the connector and linked platform relative to the upright member at a plurality of positions. Moreover, such positions may range from a horizontal position to a vertical position, as well as intermediate positions at certain angles relative to the horizontal. For example, locking means may fix the rotational position of the platform at a 45-degree angle relative to the horizontal surface. In this manner, the platform may be employed to carry cargo in its horizontal position, may be stored in a vertical position when not in use, or placed in an intermediate position at an angle relative to the horizontal surface in order to gain access to the rear door of the vehicle and the like. In any case, any plurality of positions of the platform above the ground surface fix such platform at a height greater than the axis of the hitch. In this manner, the platform possesses sufficient clearance from the ground surface when the vehicle is being used with the platform. Such rotational movement fixation by the locking means may be achieved by a plurality of openings between the upright member and the connector which align with one another and are capable of being fixed by a bolt or other elongated member.

It may be apparent that a novel and useful vehicle hitch supported cargo carrier mechanism has been hereinabove described.

It is therefore an object of the present invention to provide a vehicle hitch supported cargo carrier mechanism which provides a platform that is connectable to the trailer hitch of a vehicle for use as desired.

Another object of the present invention is to provide a vehicle hitch supported cargo carrier mechanism which includes a platform which is rotatable between a horizontal position for use and a vertical position for storage.

Another object of the present invention is to provide a vehicle hitch supported cargo carrier mechanism which includes a platform that is rotatable relative to the vehicle hitch and includes a position of fixation that is angularly measured relative to a horizontal surface, permitting the user to gain access to the cargo door at the rear of a vehicle.

A further object of the present invention is to provide a vehicle hitch supported cargo carrier mechanism which is sturdy and supports a platform in a plurality of positions above the road surface, each of which is above the level of the trailer hitch in order to provide sufficient clearance from the road surface when the vehicle and platform are in use.

The invention possesses other objects and advantages especially as concerns particular characteristics and features thereof which will become apparent as the specification continues.

For a better understanding of the invention reference is made to the following detailed description of the preferred embodiments thereof which should be taken in conjunction with the prior described drawings.

DETAILED DESCRIPTION OF THE PREFERRED EMBODIMENTS OF THE INVENTION

Various aspects of the present invention will evolve from the following description of the preferred embodiments thereof which should be referenced to the prior delineated drawings.

Figure 1:
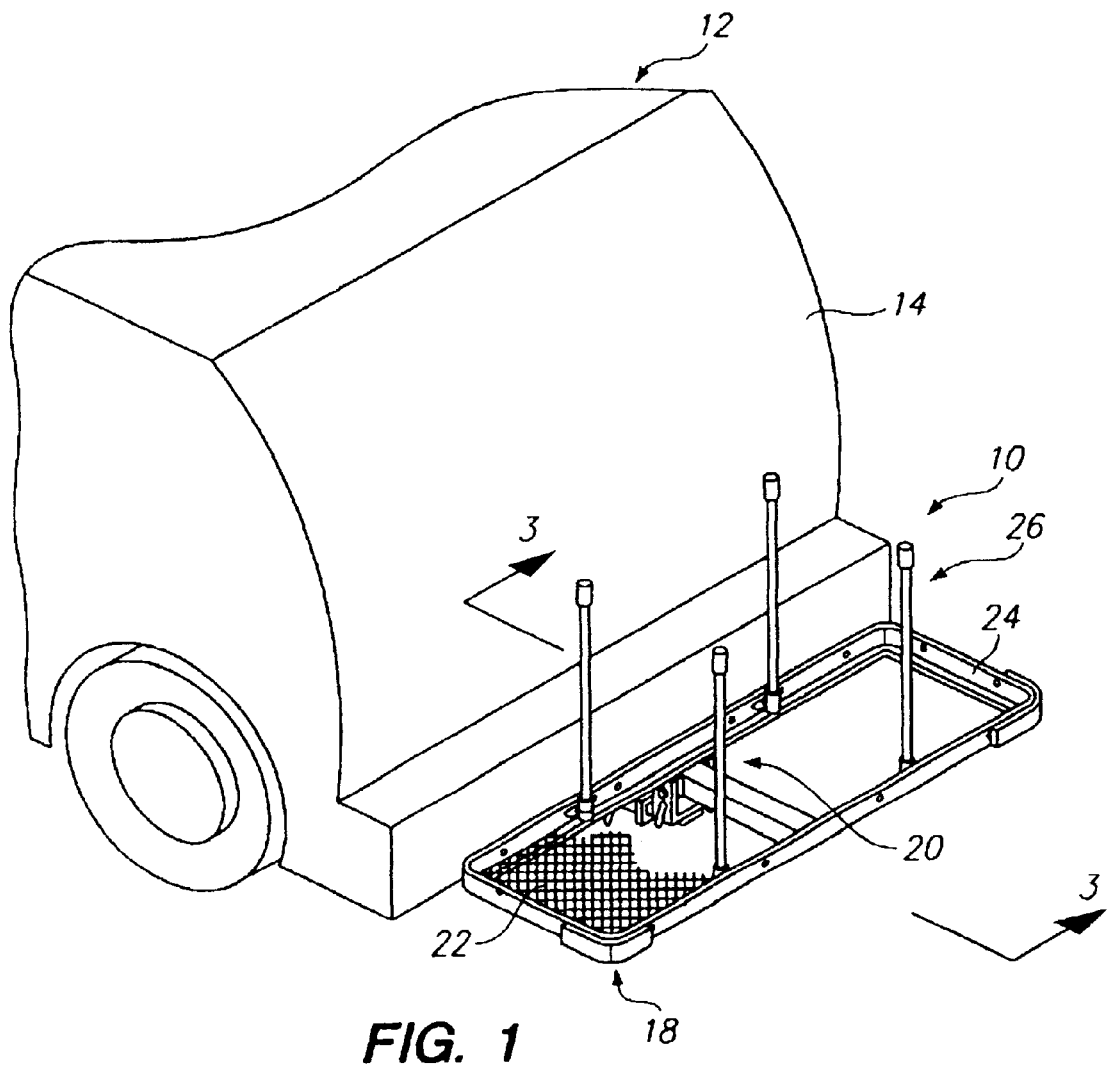
FIG. 1 is a perspective view of the mechanism of the present invention in place in a vehicle.

The invention as a whole is shown in the drawings by reference character 10. Mechanism 10, FIG. 1, is intended for use with a vehicle 12, depicted partially therein. Normally, vehicle 12 includes a rear portion 14 having a door which rotates upwardly or outwardly. Such doors are conventional and are normally referred to as cargo doors or hatchbacks. Vehicle 12 includes a trailer hitch 16, FIG. 2, which is normally intended to tow a trailer. Mechanism 10 takes the form of a platform 18 and a fastening device 20, which will be discussed in greater detail as the specification continues. Platform 18 may be of any shape or character. As shown in FIG. 1, platform 18 includes a mesh bottom 22 with a shallow wall portion 24 surrounding mesh bottom 22. Also, a quartet of removable posts 26 are illustrated to hold bulky cargo to platform 18.

Trailer hitch 16 is composed of square stock and may be described as a female type. Consequently, an adapter 28 is employed in mechanism 10 which includes a male fitting 30 having a plurality of aligned openings 32 therethrough, in the conventional manner. Adapter 28 fits into the chamber 34 of trailer hitch 16 and is held in place by pin 36 and cotter pin 38. Mitred end portion 29 improves the clearance of adapter 28 relative to ground surface 86 when vehicle 12 transitions between a horizontal plane and an inclined plane, a situation occurring when vehicle 12 enters a driveway.

Mechanism 10 also includes a base member 40 which is connected to adapter 28, by welding, gluing, using fasteners, and the like. Upright element 42, in the preferred embodiment shown herein, includes a plate 44 spaced from another plate 46 forming a recess 48 therebetween. Plates 44 and 46 include a plurality of aligned openings 50, the purpose of which will become apparent as the specification continues.

Figure 2:
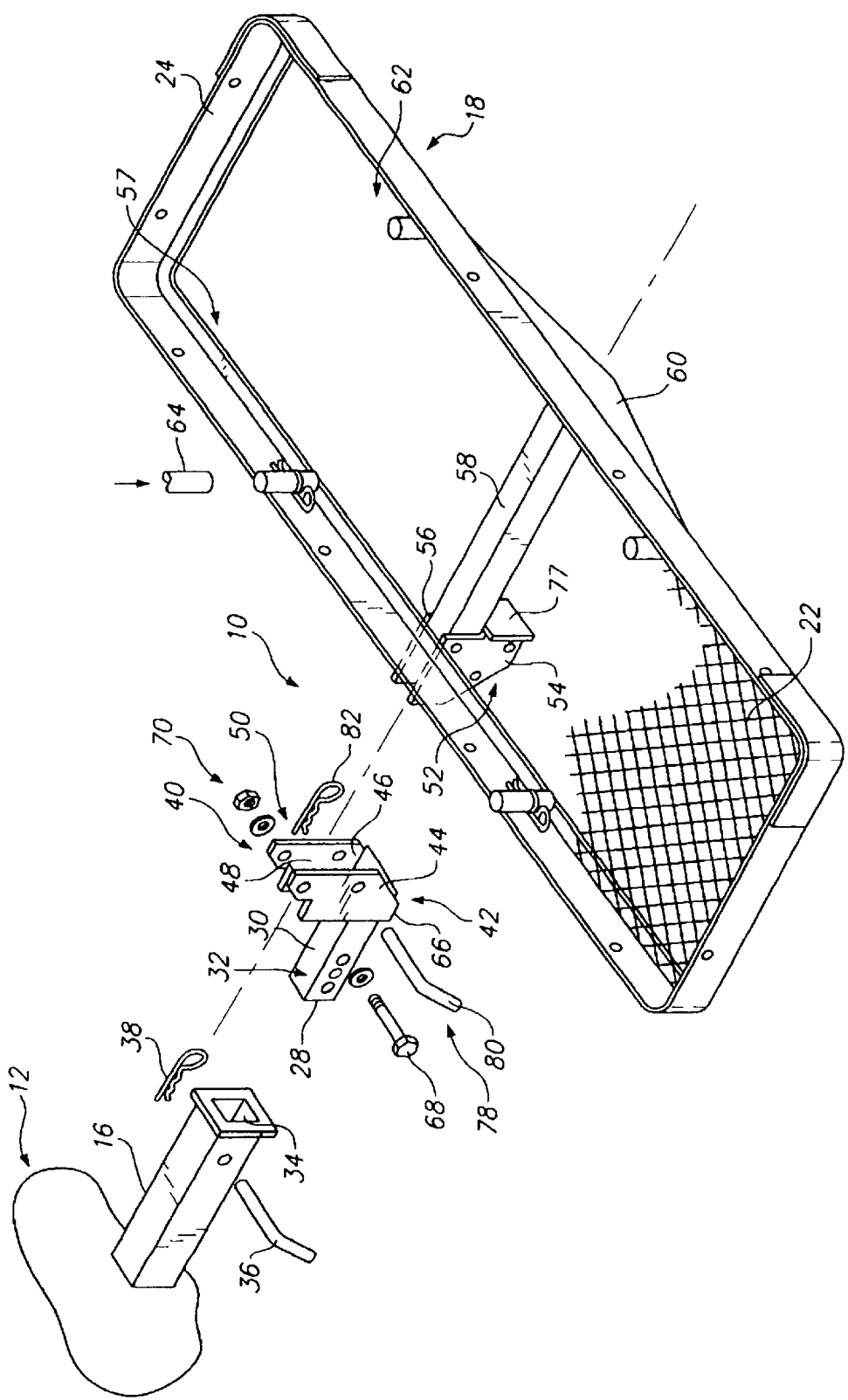
FIG. 2 is an exploded view of the carrier mechanism of the present invention indicating its relationship to a vehicle hitch.

Platform 18, FIG. 2, includes a connector 52 which possesses plates 54 and 56 connected to bar 58. Bar 58 and plates 54 and 56 are fastened to the frame 57 of platform 18 by welding, or other suitable means. Connector 52 may take other forms commensurate with the particular configuration of upright member 42. Gusset 60 strengthens platform 18. Plurality of receivers 62 are also depicted in FIG. 2 with respect to platform 18 to hold plurality of posts 26 such as post 64, partially depicted. It should be noted that plates 54 and 56 of connector 52 fit within recess 48 of base member 40. Plurality of openings 66 in plates 54 and 56 align with one another and the plurality of openings 50 plates 44 and 46 to permit fixation and rotation of platform 18 relative to base member 40, which will be further described hereinafter.

Figure 3:
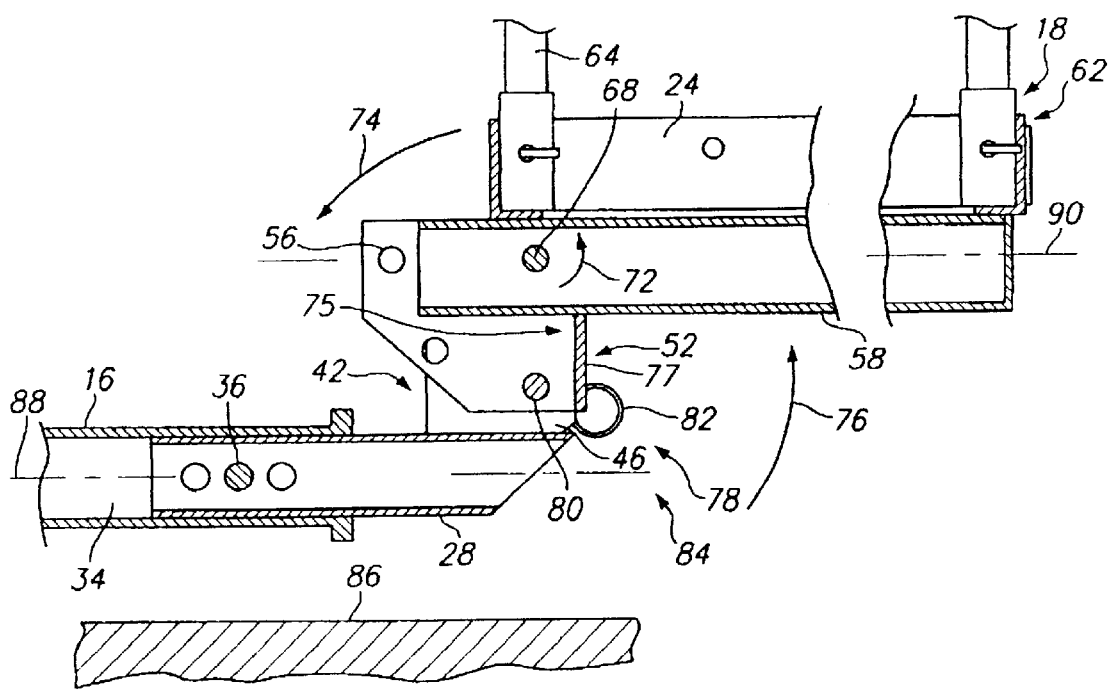
FIG. 3 is a sectional view taken along line 3—3 of FIG. 1.

With reference to FIG. 3, it may be observed that adapter 28 has been placed within recess 34 of hitch 16 held in place by pin 36. It should be understood that cotter pin 38 holds pin 36 in place. Connector 52 is shown as being rotatable connected to upright element 42. Specifically, plate 56 of connector 52 is shown as rotating relative to plate 46 of upright element 42. Such rotation takes place through bolt 68 which passes through openings in plates 44 and 46 as well as openings in plates 54 and 56 that are aligned. Bolt 68 is depicted in FIG. 2 with the pertinent washers and nuts 70. Directional arrows 72, 74, and 76 depicts such rotational movement of platform 18 in FIG. 3. Stop means 75, in the form of strip 77, aids in preventing rotation of platform 18 downwardly toward surface 86.

Figure 4:
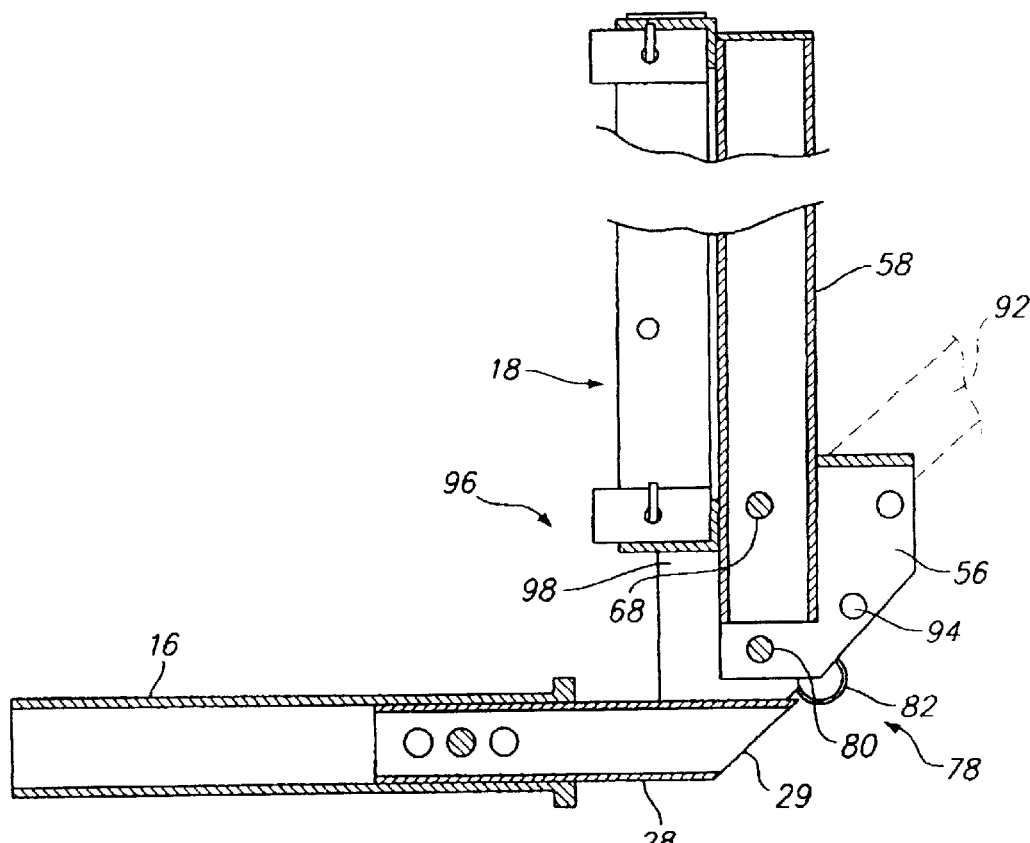
FIG. 4 is a sectional view similar to FIG. 3 in which the platform and connector portion of the mechanism have be rotated 90 degrees, showing a 45-degree position in phantom.

Locking means 78 is also illustrated in FIGS. 2, 3, and 4. Locking means externalizes in a pin 80 and cotter pin 82. Again, openings in plates 44 and 46 align with openings in plates 54 and 56 to hold platform 18 in the position shown in FIG. 3. Pin 80 also serves as stop means 75 to prevent further rotation of platform 18 toward ground surface 86. It should be noted that in the position depicted in FIG. 3, the platform 18 is located further from ground surface 86 than the axis 88 of trailer hitch 16. That is to say, the axis 90 of bar 58 is parallel and super positioned relative to axis 88 of hitch 16. Turning to FIG. 4, it may be seen that platform 18 has been rotated into a vertical position about bolt 68 forming such pivot. Again, pin 80 and cotter pin 82 are used to fix or lock platform 18 into this position by the use of particular openings in plates 54 and 56 of connector 52 and openings within plates 44 and 46, all of which are alignable. Platform 18 may also be locked in a position roughly at 45 degrees relative to ground surface 86 shown in phantom as platform portion 92 in FIG. 4. In such case, opening 94 as well as another opening in plate 54 and a pair of openings in plates 44 and 46, all alignable, would permit such locking position. In such angular position, one would gain access to the rear of vehicle 12 without removing mechanism 10 from the vehicle. Likewise, the position depicted in FIG. 4, a vertical position would suffice for storing platform 18 when cargo is not being carried, again permitting mechanism 10 to be retained at vehicle 12. Stop means 96, in the form of a shelf 98, acts in concert with pin 80 to prevent further rotation of platform 18.

In operation, mechanism 10 is connected to trailer hitch 16 of vehicle 12 by the use of adapter 28. Base member 40 then links to connector 52 of platform 18 by the use of bolt 68, which serves as the pivot for rotation of platform 18 relative to upright member 42 and, thus, vehicle 12. Pin 80 locks platform 18 into a plurality of positions, three of which are illustrated in FIGS. 3 and 4 in order to carry cargo, store platform 18, or merely position platform 18 to gain access to the rear of vehicle 12. In all cases, platform 18 lies well above the axis 88 of trailer hitch 18 providing ample clearance for platform 18 when used with vehicle 12.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A vehicle hitch supported cargo carrier mechanism connectable to the hitch of the vehicle located above the ground surface, comprising:

a. an adaptor connecting to the hitch of the vehicle;

b. a base member connected to said adaptor said base member comprising an upright element, said upright element extending outwardly from said adaptor, said base member upright element further comprising a first plate and a second plate, said first and second plates forming a recess, said base member further including a first stop preventing rotation of said platform in one direction of rotation, and a second stop for preventing rotation of said platform in another direction of rotation;

c. a platform;

d. a connector linked to said platform, said connector rotatably fastened to said upright element, said connector fitting within said recess, said connector further comprising a third plate and a spaced fourth plate, said third plate lying immediately adjacent said first plate and said fourth plate lying immediately adjacent said second plate in said recess; and e. locking means for fixing the rotating movement of said connector and linked platform relative to said upright element at a plurality of positions, said platform lying further above the ground surface than the hitch when said platform is fixed in any of said plurality of positions.

2. The mechanism of claim 1 in which said locking means for fixing the rotation movement of said connector and linked platform comprises an opening in each of said first, second, third, and fourth plates, each of said openings being alignable with all of said other openings.

3. The mechanism of claim 2 in which said locking mechanism further comprises an elongated member passing through each of said aligned openings.

4. A vehicle hitch supported cargo carrier mechanism connectable to the hitch of the vehicle located above the ground surface, comprising:

a. an adaptor connecting to the hitch of the vehicle;

b. a base member connected to said adaptor said base member comprising an upright element, said upright element extending outwardly from said adaptor, said base member upright element comprising a first plate and a second plate, said first and second plates forming a recess;

c. a platform, said platform further comprising at least one post extending outwardly therefrom said at least one post being removably held to said platform;

d. a connector linked to said platform, said connector rotatably fastened to said upright element, said connector fitting within said recess; and e. locking means for fixing the rotating movement of said connector and linked platform relative to said upright element at a plurality of positions, said platform lying further above the ground surface than the hitch when said platform is fixed in any of said plurality of positions.

5. The mechanism of claim 4 in which said base member further includes a first stop preventing rotation of said platform in one direction of rotation, and a second stop for preventing rotation of said platform in another direction of rotation.

6. The mechanism of claim 5 connector comprises a third plate and a spaced fourth plate, said third plate lying immediately adjacent said first plate in said recess.

7. The mechanism of claim 6 in which said locking means for fixing the rotation movement of said connector and linked platform comprises an opening in each of said first, second, third, and fourth plates, each of said openings being alignable with all of said other openings.

8. The mechanism of claim 7 in which said locking mechanism further comprises an elongated member passing through each of said aligned openings.

* * * * *

(12) EX PARTE REEXAMINATION CERTIFICATE (5969th)
United States Patent
Jain

(10) Number: US 6,390,343 C1
(45) Certificate Issued: Oct. 23, 2007

(54) CARGO CARRIER MECHANISM

(76) Inventor: Vinoo Kumar Jain, 3416 Spartan Way, Sacramento, CA (US) 95826

Reexamination Request:
No. 90/007,663, Aug. 9, 2005

Reexamination Certificate for:
Patent No.: 6,390,343
Issued: May 21, 2002
Appl. No.: 09/637,966
Filed: Aug. 11, 2000

(51) Int. Cl.
*B60R 9/00* (2006.01)

(52) U.S. Cl. .................. 224/524; 224/504; 224/505; 224/506; 224/507; 224/924

(58) Field of Classification Search .................. None
See application file for complete search history.

(56) References Cited

U.S. PATENT DOCUMENTS

| | | |
|---|---|---|
| 5,427,289 A | 6/1995 | Ostor |
| 5,676,292 A | 10/1997 | Miller |
| 5,775,560 A | 7/1998 | Zahn et al. |
| 5,806,736 A | 9/1998 | Kincart |
| 5,806,737 A | 9/1998 | Clark |
| 5,853,278 A | 12/1998 | Frantz |
| 5,862,966 A | 1/1999 | Mehls |
| 6,006,973 A | 12/1999 | Belinky et al. |
| 6,062,451 A | 5/2000 | Lassanske et al. |
| 6,253,981 B1 * | 7/2001 | McLemore .................. 224/526 |

OTHER PUBLICATIONS

The Original Masterbuilt Hitch–Haul Wheel Free Carriers, 1998, pp. 1–6, Columbus, GA.

* cited by examiner

*Primary Examiner*—Michael O'Neill

(57) ABSTRACT

A vehicle hitch supported cargo carrier mechanism connectable to the hitch of the vehicle located above a ground surface utilizing an adapter. The adapter connects to the hitch of the vehicle. A base member is connected to the adapter and utilizes an upright element, which extends outwardly from the adapter. A platform capable of carrying cargo links to connector. The connector is rotatably fastened to the upright element permitting the platform to also rotate from a horizontal position to a vertical position. A lock fixes the rotational movement of the platform as desired between the horizontal and vertical position.

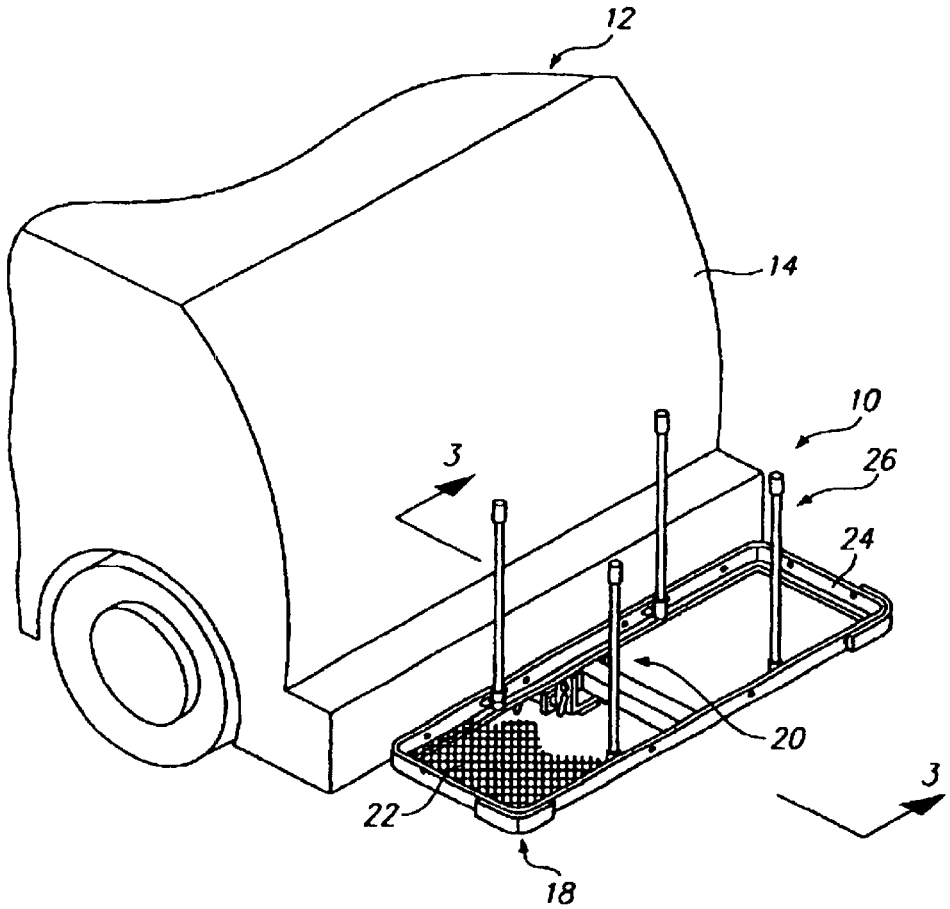

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 4–8 is confirmed.

Claims 1–3 are cancelled.

New claims 9 and 10 are added and determined to be patentable.

9. *A vehicle hitch supported cargo carrier mechanism connectable to the hitch of the vehicle located above the ground surface, comprising:*

*a. an adaptor connecting to the hitch of the vehicle;*

*b. a base member connected to said adaptor said base member comprising an upright element, said upright element extending outwardly from said adaptor, said base member upright element further comprising a first plate and a second plate, said first and second plates forming a recess, said base member further including a first stop preventing rotation of said platform in one direction of rotation, and a second stop for preventing rotation of said platform in another direction of rotation;*

*c. a platform;*

*d. a connector linked to said platform, said connector rotatably fastened to said upright element, said connector fitting within said recess, said connector further comprising a third plate and a spaced fourth plate, said third plate lying immediately adjacent said first plate and said fourth plate lying immediately adjacent said second plate in said recess; and*

*e. locking means for fixing the rotating movement of said connector and linked platform relative to said upright element at a plurality of positions, said platform lying further above the ground surface than the hitch when said platform is fixed in any of said plurality of positions, said locking means including an opening in each of said first, second, third and fourth plates, each of said opening being alignable with all of said other openings.*

10. *The mechanism of claim* 9 *in which said locking mechanism further comprises an elongated member passing through each of said aligned openings.*

\* \* \* \* \*